(12) United States Patent  
Dinu

(10) Patent No.: US 12,362,691 B2  
(45) Date of Patent: Jul. 15, 2025

(54) SPEED CONTROL OF MECHANICALLY PARALLELED ELECTRICAL DRIVES WITHOUT INTERCOMMUNICATION BUSES

(71) Applicant: Hamilton Sundstrand Corporation, Charlotte, NC (US)

(72) Inventor: Andrei Dinu, Leicester (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 61 days.

(21) Appl. No.: 18/117,137

(22) Filed: Mar. 3, 2023

(65) Prior Publication Data
US 2023/0283208 A1    Sep. 7, 2023

(30) Foreign Application Priority Data

Mar. 7, 2022    (EP) .................................... 22275027

(51) Int. Cl.
*H02P 6/04*    (2016.01)
*H02K 7/14*    (2006.01)
*H02K 11/21*    (2016.01)
*H02K 11/33*    (2016.01)

(52) U.S. Cl.
CPC ................ *H02P 6/04* (2013.01); *H02K 7/14* (2013.01); *H02K 11/21* (2016.01); *H02K 11/33* (2016.01); *H02P 2006/045* (2013.01)

(58) Field of Classification Search
CPC ....... H02P 2006/045; H02P 6/04; H02K 7/14; H02K 11/33; H02K 11/21
See application file for complete search history.

(56) References Cited

U.S. PATENT DOCUMENTS

| | | |
|---|---|---|
| 9,139,096 B2 | 9/2015 | Morris |
| 9,327,830 B2 | 5/2016 | Bayer |
| 10,131,248 B2 | 11/2018 | Tang |
| 2005/0238335 A1* | 10/2005 | Miyazaki .............. H02P 29/045 |
| | | 318/434 |
| 2010/0206033 A1 | 8/2010 | Ishida et al. |

(Continued)

FOREIGN PATENT DOCUMENTS

| | | |
|---|---|---|
| EP | 3276816 A1 | 1/2018 |
| FR | 3104138 A1 | 6/2021 |
| JP | S6185090 A | 4/1986 |

OTHER PUBLICATIONS

The Balanced Current Control of Dual-Redundancy Permanent Magnetic Brushless DC Motor (Ma Ruiqing, Liu Weiguo, Luo Guangzhao, Hu Yashan Automation College, Northwestern Polytechnical University, Xi'an 710072, China) Date of Conference: Sep. 27-29, 2005 Print ISBN:7-5062-7407-8 (Year: 2005).*

(Continued)

*Primary Examiner* — Jorge L Carrasquillo

(57) ABSTRACT

There is provided herein an electrical motor and associated motor drive. The motor comprises an output shaft, and a speed sensor configured to measure the speed of the output shaft. The motor drive comprises a controller configured to output a current demand for the motor based on a speed error between a desired speed of the output shaft and the measured speed of the output shaft, and a feedback signal of the output current demand scaled by a first gain.

20 Claims, 7 Drawing Sheets

(56) References Cited

U.S. PATENT DOCUMENTS

2020/0180149 A1* 6/2020 Tsuboi .................. B25J 9/126

OTHER PUBLICATIONS

Royak et al. (EP 2858233 A2) High Dynamic Control Apparatus for Current Source Converter Background Date Published Apr. 8, 2015 (Year: 2015).*
Extended European Search Report of European Patent Application No. EP22275027.5, dated Sep. 5, 2022.
Ruiqing, M., et al: "The Balanced Current Control of Dual-Redundancy Permanent Magnetic Brushless DC Motor", Electrical Machines and Systems, 2005. ICEMS 2005. Proceedings of the Eighth International Conference on Nanjing, China Sep. 27-29, 2005, Piscataway, NJ, USA, IEEE, vol. 1, Sep. 27, 2005 (Sep. 27, 2005), pp. 475-479, XP010877431, ISBN: 978-7-5062-7407-4.
Zhou Yong, et al: "The controller design for permanent magnet motor with complete electrical double redundancy structure", 2017 Prognostics and System Health Management Conference (PHM-Harbin), IEEE, Jul. 9, 2017 (Jul. 9, 2017), pp. 1-5, XP033233524, DOI: 10.1109/PHM.2017.8079138, [retrieved on Oct. 20, 2017].
Communication pursuant to Article 94(3) EPC dated Feb. 6, 2025 in connection with European Patent Application No. 22275027.5, 7 pages.
Panda et al., "Gain-scheduled PI Speed Controller for PMSM Drive," Proceedings of the IEEE IECON, International Conference on Industrial Electronics, Control, and Instrumentation, vol. 2, Nov. 1997, 6 pages.

* cited by examiner

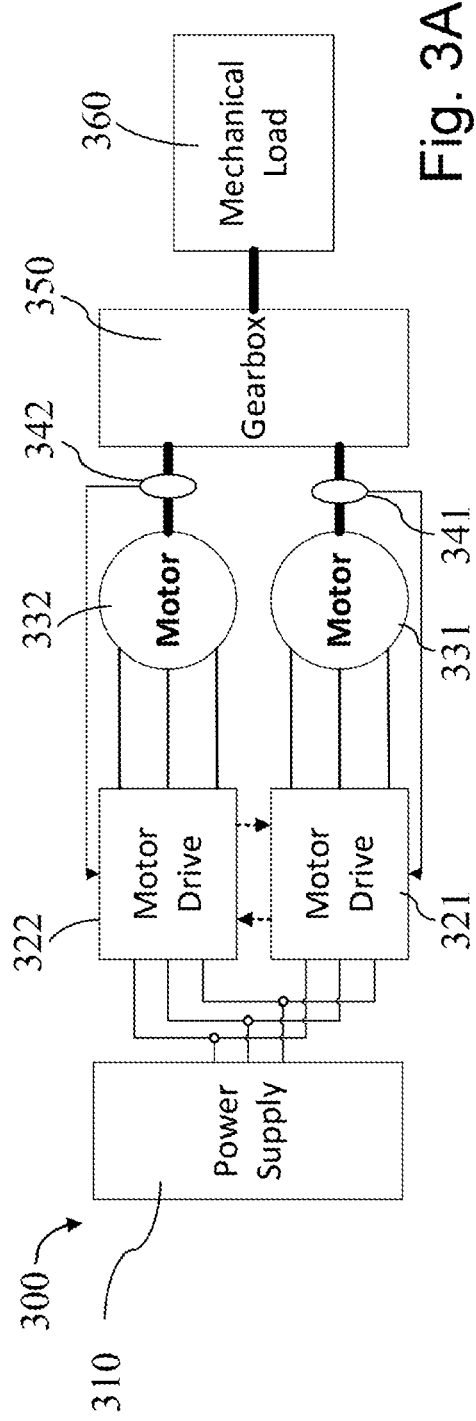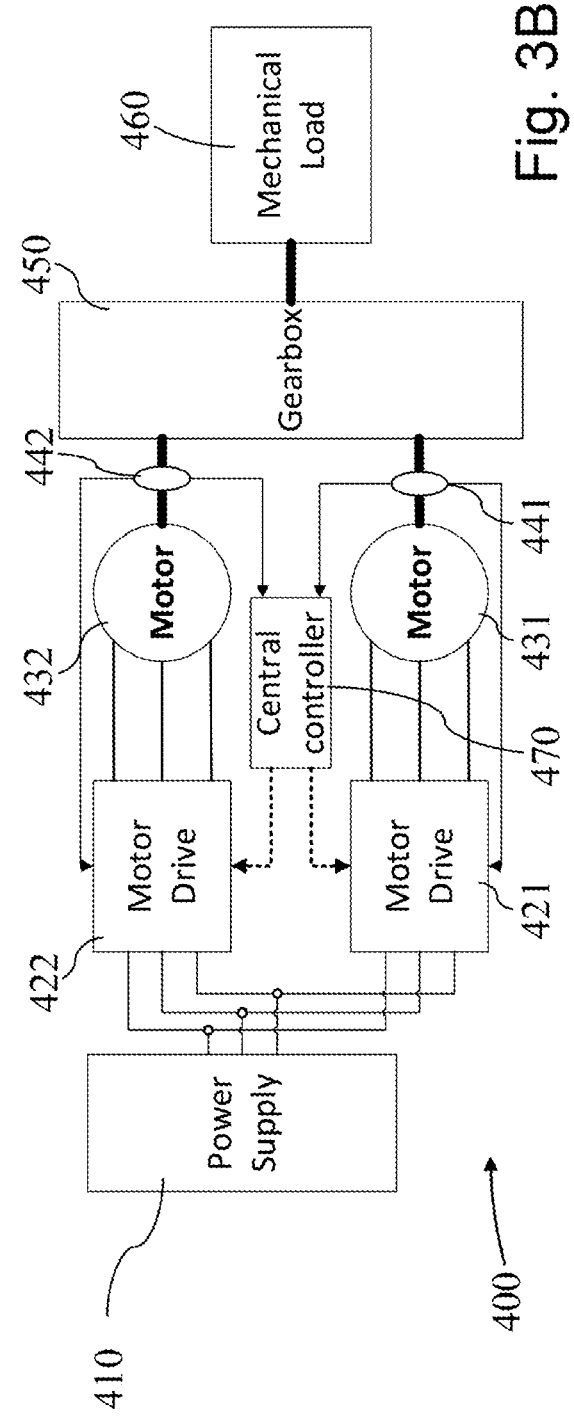

SPEED CONTROL OF MECHANICALLY PARALLELED ELECTRICAL DRIVES WITHOUT INTERCOMMUNICATION BUSES

CROSS-REFERENCE TO RELATED APPLICATIONS

This application claims priority to and the benefit of European Patent Application No. 22275027.5, filed Mar. 7, 2022, the entire content of which is incorporated herein by reference.

FIELD

This invention relates to the speed control of mechanically paralleled electrical drives, and specifically, ensuring load balancing between mechanically paralleled electrical drives without the use of intercommunication buses.

BACKGROUND

Typical electromechanical drive systems use a single power converter and a single electrical motor to drive a single mechanical load. However, multiple motors can be used in parallel in order to drive a large load, such as an electric propulsion application, or to provide redundancy when fault tolerance is desired. This may be the case in Design Assurance Level A (DAL A) applications on commercial aircraft, wherein failure of the system may be catastrophic.

Such fault tolerance allows for the system to continue to operate (possibly at reduced performance levels) after a fault has occurred in one part of the system. Detailed product requirements will always define which part of the system is subject to fault tolerance. One way to provide improved fault tolerance is to reduce the amount of single failure points in a system. For example, fault tolerance may be provided by the use of multiple motors used in parallel. However, in such a case, there is a need to ensure balanced torque production between the motors. It would be desirable to provide such a balanced torque production, whilst reducing the number of single failure points in the system.

SUMMARY

In a first aspect, there is provided an electrical motor and associated motor drive. The motor comprises an output shaft, and a speed sensor configured to measure the speed of the output shaft. The motor drive comprises a controller that is configured to output a current demand for the motor based on a speed error between a desired speed of the output shaft and the measured speed of the output shaft, and a feedback signal of the output current demand scaled by a first gain.

The electrical motor and associated motor drive may find particular use when provided as part of a system, with 2 to N paralleled motors that drive a common mechanical load. Such motors and drives can find use in any paralleling solution.

In this way, in a second aspect, there is provided a system which comprises a mechanical load, a first electrical motor and associated motor drive, and a second electrical motor and associated motor drive.

Each electrical motor and associated motor drive is an electrical motor and associated motor drive as outlined in the first aspect. Each of the first and second electrical motors are configured to drive the mechanical load in parallel.

Therefore, in the second aspect, the first electrical motor and associated first drive comprises an output shaft, and a speed sensor configured to measure the speed of the output shaft. The first motor drive comprises a first controller that is configured to output a current demand for the first motor based on a speed error between a desired speed of the output shaft and the measured speed of the output shaft, and a feedback signal of the output current demand scaled by a first gain. The second electrical motor and associated second drive comprises an output shaft, and a speed sensor configured to measure the speed of the output shaft. The second motor drive comprises a second controller that is configured to output a current demand for the second motor based on a speed error between a desired speed of the output shaft and the measured speed of the output shaft, and a feedback signal of the output current demand scaled by a first gain.

As above, such a system can be applied in any paralleling solution.

The first and second electrical motors may be configured to drive the mechanical load via a gearbox. In such a case, the output shaft and speed sensor of the first electrical motor may be a first output shaft and a first speed sensor respectively, and similarly the second electrical motor may be a second output shaft and a second output speed sensor respectively. Then, each of the first and the second output shafts may be inputs into a gearbox, which is connected at its output to the mechanical load.

Alternatively, the first and second electrical motors share a common output shaft. Therefore, the output shaft of the first electrical motor and the output shaft of the second electrical motor may be the same output shaft. In addition, both motors and their drives may share the same speed sensor for calculating the speed error.

The system may comprise at least a third electrical motor and associated motor drive configured to drive the mechanical load in parallel with the first and second electrical motors.

By providing paralleled motors that operate on the basis of a current demand based on a speed error as well as a feedback signal of the output demand, it is possible to provide load balancing in the paralleled motors, without providing any direct communication between the motors. This improves the reliability of the motors, as it promotes more balance torque sharing, whilst keeping the number of common faults in the system to a minimum.

The electrical motors and associated motor drives referred to above may comprise means to vary the first gain. By varying the amount of gain that is applied to the feedback, it is possible to tailor the response of the circuit to an imbalance between the motors.

The means to vary the first gain may be configured to apply gain scheduling techniques so as to apply larger gain values during speed transients, and smaller gain values during steady-state operation of the motor. By using such gain scheduling, it is possible to achieve load balancing quickly, with a high first gain, and then during steady-state operation, it is possible to reduce steady-state error with a lower gain.

The motor drive may be configured to scale the desired speed of the output shaft by a second gain prior to calculating the speed error. This allows for steady-state error to be mitigated, by providing a feedforward gain to increase the speed demand, and therefore an error that might be introduced by the first gain can be compensated for.

The electrical motor and associated motor drive may comprise means to vary the second gain. Specifically, the means to vary the second gain may be configured to vary the second gain based on the measured speed of the output shaft. This allows for the second gain to compensate for steady-state error in cases where load torque varies with speed.

In a third aspect, there is provided a method for outputting a current demand to drive an electrical motor of paralleled electric motors driving a mechanical load, the method comprising: receiving a desired speed output of the motor; measuring the actual speed output of the motor; calculating a speed error between the desired speed output of the motor and the actual speed output of the motor; outputting a current demand to drive the motor based on a speed error between a desired speed of the output shaft and the measured speed of the output shaft, and a feedback signal of the output current demand scaled by a first gain.

Such a method may be equally applied to drive each motor of the paralleled electric motors.

The method may further comprise varying the first gain, and specifically the varying the first gain may comprise applying gain scheduling techniques so as to apply larger gain values during speed transients, and smaller gain values during steady-state operation of the motor.

The method may comprise scaling the desired speed of the output shaft by a second gain prior to calculating the speed error. The second gain may be varied, and specifically may be varied based on the measured speed of the output shaft.

BRIEF DESCRIPTION OF THE DRAWINGS

Certain examples of the disclosure will now be described, by way of example only, with reference to the accompanying drawings, in which:

FIG. 3A is a schematic diagram of a system with paralleled electric motors configured to drive a common mechanical load, wherein there are provided communication buses between the motor drives;

FIG. 3B is a schematic diagram of a system with paralleled electric motors configured to drive a common mechanical load, wherein there is provided a central controller that communicates a common current demand to the paralleled drives;

DETAILED DESCRIPTION

Whilst the description herein refers to only two paralleled motors driving a common load, it would be appreciated that the teaching herein could be applied to any number of motors driving a mechanical motor. For example, there could be three or more paralleled motors configured to drive a common load. In addition, whilst the description herein describes a common load that is connected via a gearbox, it will be appreciated that the present invention may find use in other paralleling solutions. For example, rather than the paralleled motors being connected to a gearbox, both motors may share a common shaft.

Figure 1:
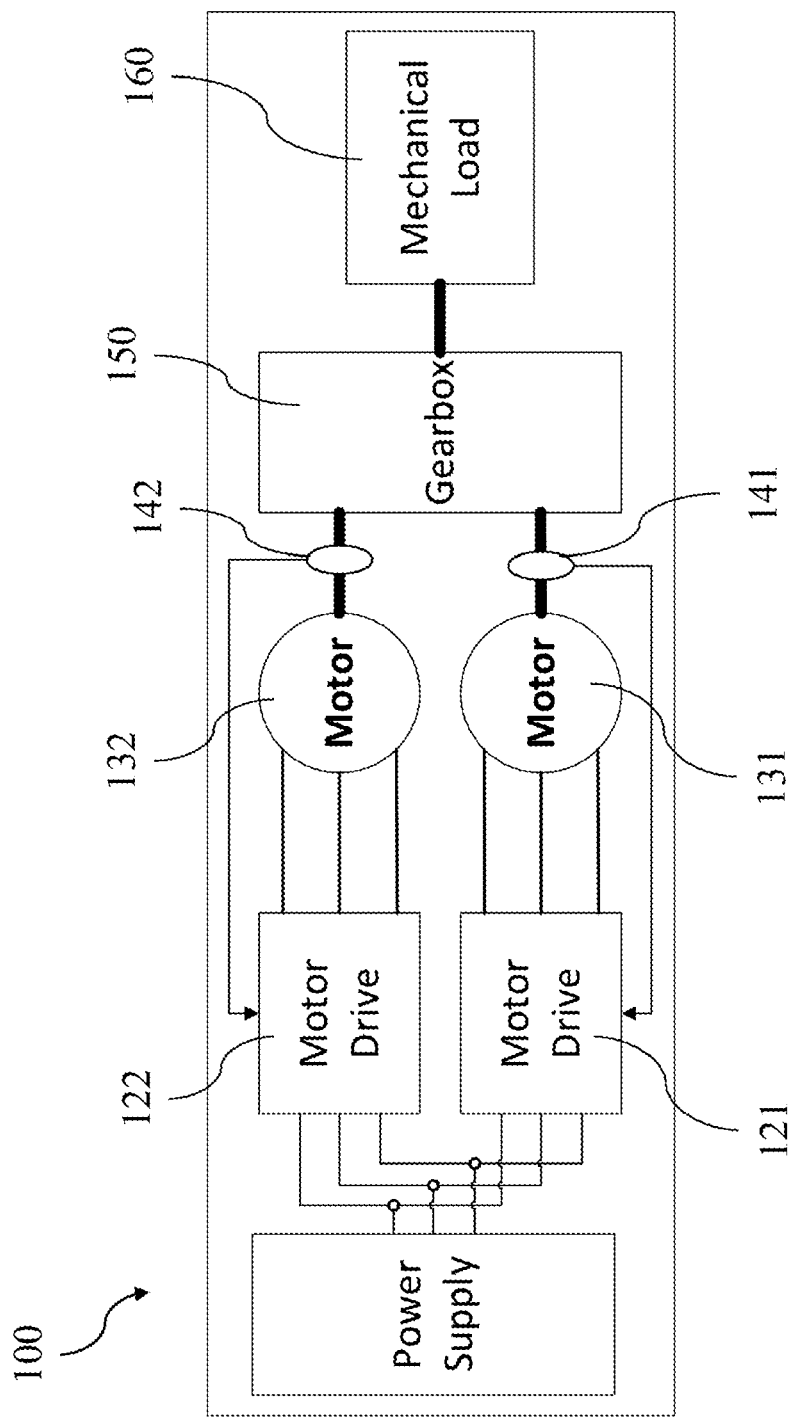
FIG. 1 is a schematic diagram of system with paralleled electric motors configured to drive a common mechanical load.

An example of system 100 comprising parallel motors is shown in FIG. 1. The system 100 comprises a power supply 110, paralleled motor drives 121, 122, each driving a respective motor 131, 132. Both motors 131, 132 are connected via respective shafts to a single gearbox 150, which in turn is connected to a mechanical load 160 through another shaft. The output of each motor 131, 132 is measured by a respective speed sensor 141, 142 on their respective shafts. The measured speed output is fed back to its respective motor drive.

Such a system 100 may continue to operate if a fault develops in one of the electrical motor drives 121, 122 or one of the motors 131, 132, but not when the gearbox 150 is affected. In this case, the gearbox 150 is a single point of failure.

Whilst the system 100 of FIG. 1 provides a level of redundancy in the motor drives 121, 122 and motors 131, 132, there is no mechanism that allows for the motors 131, 132 to ensure balanced torque production. Typically, each of the motor drives 121, 122 operate on the basis of calculating a simple speed error between the reference/desired speed and the speed fed back from their respective speed sensor 141, 142, inputting this error to a proportional integral (PI) controller (or any suitable controller) in order to modify the current demand of the given motor drive. If there is no speed error (i.e. the measured speed at the output of the motors matches the desired speed), then there is no change in the current demand produced by the PI controller.

Therefore, fair torque sharing does not happen naturally, without specific intervention/control. There is a natural tendency of one drive 121, or 122 to demand more current than the other due to small differences in the speed measurements during transient operation (i.e. during acceleration/deceleration).

Speed feedback and motor angular position of a motor output shaft are measured together by a single sensor in electrical drive systems. The two quantities are closely related to each other by well-known relationships (the motor angle being the time integral of the motor speed, the motor speed being the time derivative of the motor angle). Consequently, steady-state speed measurement is very precise. Any persistent speed measurement inaccuracy would be in the form of a dc-offset and is equivalent to a linearly increasing angular position error. The error limits imposed on angular position measurements also ensure that average speed measurement error is zero.

However, transient speed measurements are sensitive to small variations of hardware parameters (for example, the amplitudes of resolver SIN and COS feedback signals). This can cause the current demands to diverge between mechanically paralleled drive systems. In such a case, the steady-state (i.e. the total torque demand for the mechanical load) will be reached with one drive producing more current than the other. From this point, the local current demands (i.e. the current demand of each motor drive 121, 122) tend to be preserved because the total torque produced by the paralleled drives is adequate, and therefore local speed errors will remain zero in both drives. Therefore, in the example of FIG. 1, as the local current demands are governed only by the desired output torque for the mechanical load, as long as this desired output torque is being reached, there is no further control that would then modify the local current demand such that the current demand of each motor drive 121, 122 would then self-balance.

Such current imbalances may be further exacerbated if one of the drives 121, 122 is temporarily disabled by a transient fault, such as noise on the communication bus with the aircraft, a single-event upset (SEU) in the digital controller, an over temperature condition, or any other failure that affects only one of the drives 121, 122.

Figure 2:
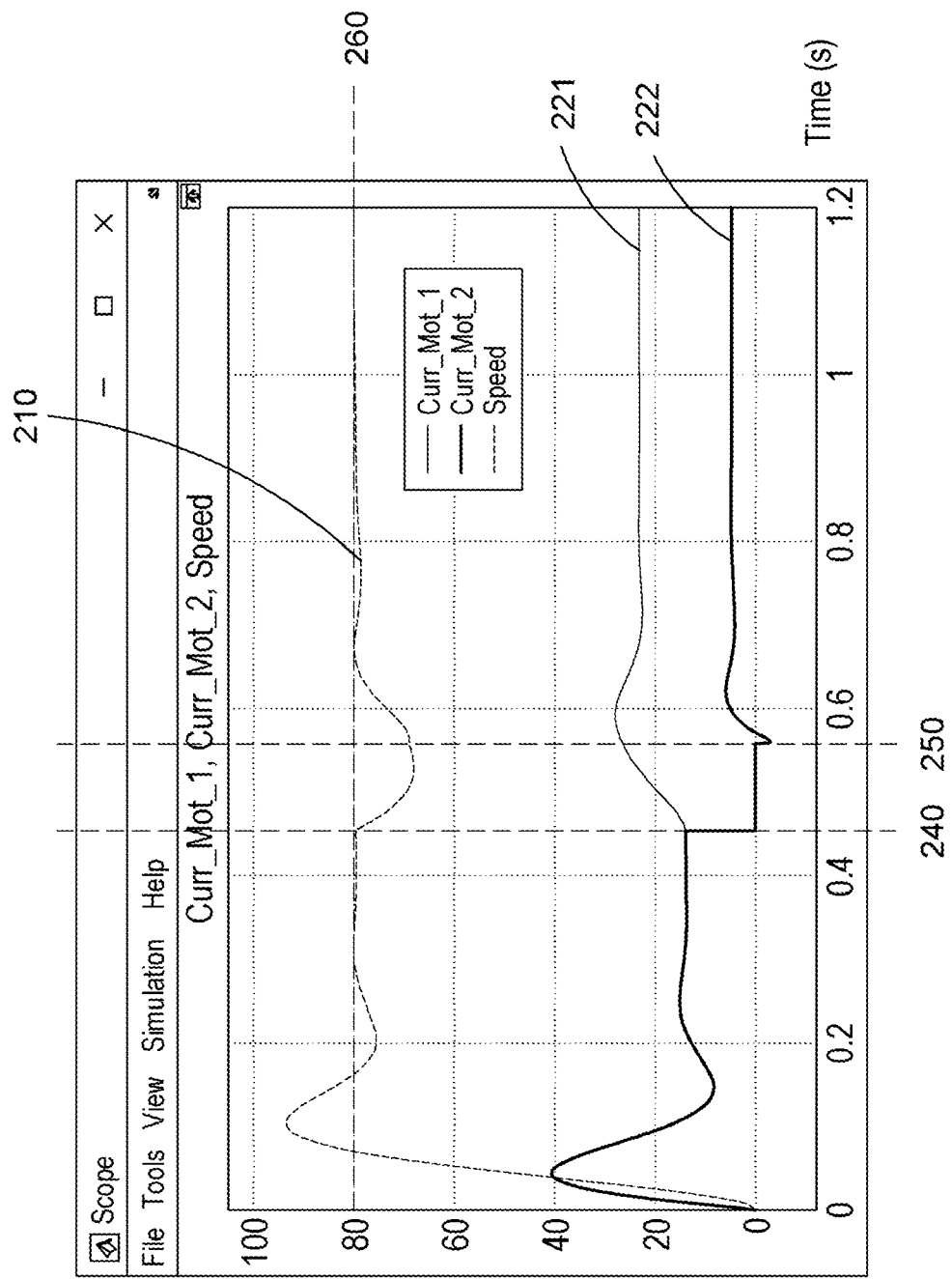
FIG. 2 is a graph showing the results of a simulation of the operation of the system of FIG. 1, and the resulting current imbalance that can result in the current demand of each motor following a temporary failure of one of the motors.

As can be seen in the simulation of FIG. 2, a temporary loss of one drive will cause loss of overall torque and decreasing speed. FIG. 2 shows the response of system 100 with a desired common speed output 260 immediately after it is turned on at time t=0, and then following a modelled fault in motor drive 122 at time 240, and the subsequent restarting of the motor drive 122 at time 250. Plotted against time on the x-axis is the common speed output 210 of the motors, the current demand 221 of motor drive 121, and the current demand 222 of motor drive 122.

As can be seen, from start up at time t=0 to time 240, the current demand 221, 222 of each motor drive is balanced, increasing the common speed output to a desired level 260 with relatively balanced current demand. At time 240, where motor drive 122 is temporarily disabled (simulating a failure in motor drive 122), the current demand 222 of motor drive 122 collapses to zero. As a result of the disabling of motor drive 122, the common speed output drops due to the corresponding drop in output torque that is caused by the failure of motor drive 122, and therefore motor 132 failing to produce torque.

The remaining motor drive 121 attempts to correct for the reduction in common output speed 210 by increasing its own current demand 221 to boost the torque production of the remaining motor 131. Whilst this might not be able to recover the full operation to the desired common speed output 260 of the system due to the comparative limited capability of one single drive, when the disabled drive 122 comes back online at time 250, it will only have to produce a comparatively small amount of current to help the system meet the desired common speed output 260. This is because the first drive 121 is already producing more than half of the necessary current (and the associated motor 131 is therefore producing more than half the required torque), due to the increased current demand 221 that resulted from when the second motor drive 122 was disabled.

As outlined above, such imbalances can result from any source, such as errors in speed measurements of speed sensors 141, 142 during transient operation.

Such a current imbalance between the two motor drives 121, 122 is undesirable. For example, a motor drive that consistently has a higher current demand is more likely to overheat, or otherwise fail. A higher torque demand is more likely to result in increased wear of one of the motors, and therefore a higher likelihood of failure in that motor. Specifically, persistently high currents in the motor can cause premature degradation of insulating materials which lead to short-circuit failures. In addition, persistently high currents in the motor drive can lead to thermal stress, which causes the semiconductor power devices to fail, whether that be either short-circuit or open-circuit depending on the type of device.

Typically, in order to address such issues, one of two approaches have been adopted, as illustrated in FIGS. 3A and 3B.

FIG. 3A shows a system that is similar to the system shown in FIG. 1, with like reference numerals indicating like components. However, in the example of FIG. 3A, there are provided communication buses (not labelled) between the paralleled motor drives 321, 322 to exchange information between the drives about the locally calculated current demands. The motor drives 321, 322 can use this information to help balance their loads, for example by using the average of the individual current demands to control their voltage demands and PWM modulation. The failure of a communication bus will not necessarily stop the operation of the receiving drive but will affect its ability to share torque equally with the other drive. In addition, the intercommunication between the motor drives 321 and 322 can introduce its own risks. For example, if a short circuit occurred in one of the motor drives, there is a possibility that the short might be transmitted through one of the communication buses, and potentially cause a failure in the other motor drive, thereby causing complete failure of the system. Additionally, if the system is reliant on such intercommunication buses, then the balanced load sharing is lost when the buses stop working, even if each drive is still functional on its own.

Alternatively, a system 400 has been adopted comprising a central controller 470 that communicates a common current demand to the paralleled drives 421, 422, as shown in FIG. 3B. Again, like reference numerals indicate like components to those found in FIG. 1 and FIG. 3A. The common current demand would ensure that each motor drive 421 and 422 is balanced. However, such a central controller needs access to the motor speed sensors, and needs to be implemented using a dual-redundant architecture, so that the central controller 470 itself does not result in a single point of failure. The resulting architecture can therefore be complicated.

There is therefore a need to provide a simplified system and control that can perform automatic torque balancing without increasing the number of single failure points within the system.

For example, the system of FIG. 1 may be provided with a modified control loop which achieves balanced torque production without a dual-redundant central controller and without relying on intercommunication between the drives. Such a control loop is illustrated by the Simulink® model shown in FIG. 4, which may be implemented in a motor drive, such as the paralleled motor drives 121, 122 of FIG. 1.

Previously, as described above, each of the motor drives 121, 122 operate on the basis of calculating a simple speed error between the reference/desired speed (Ref_Speed) and the speed fed back (Speed_Fb) from their respective speed sensor 141, 142, inputting this error to a proportional integral (PI) controller in order generate the current demand (Current_Dem). This current demand, along with a feedback signal of the current supplied (Curr_fb) is applied to a current control loop, which generates PWM signals across outputs 1 and 2 to drive the respective electric motor. The current control loop may be any appropriate current control loop.

Figure 4:
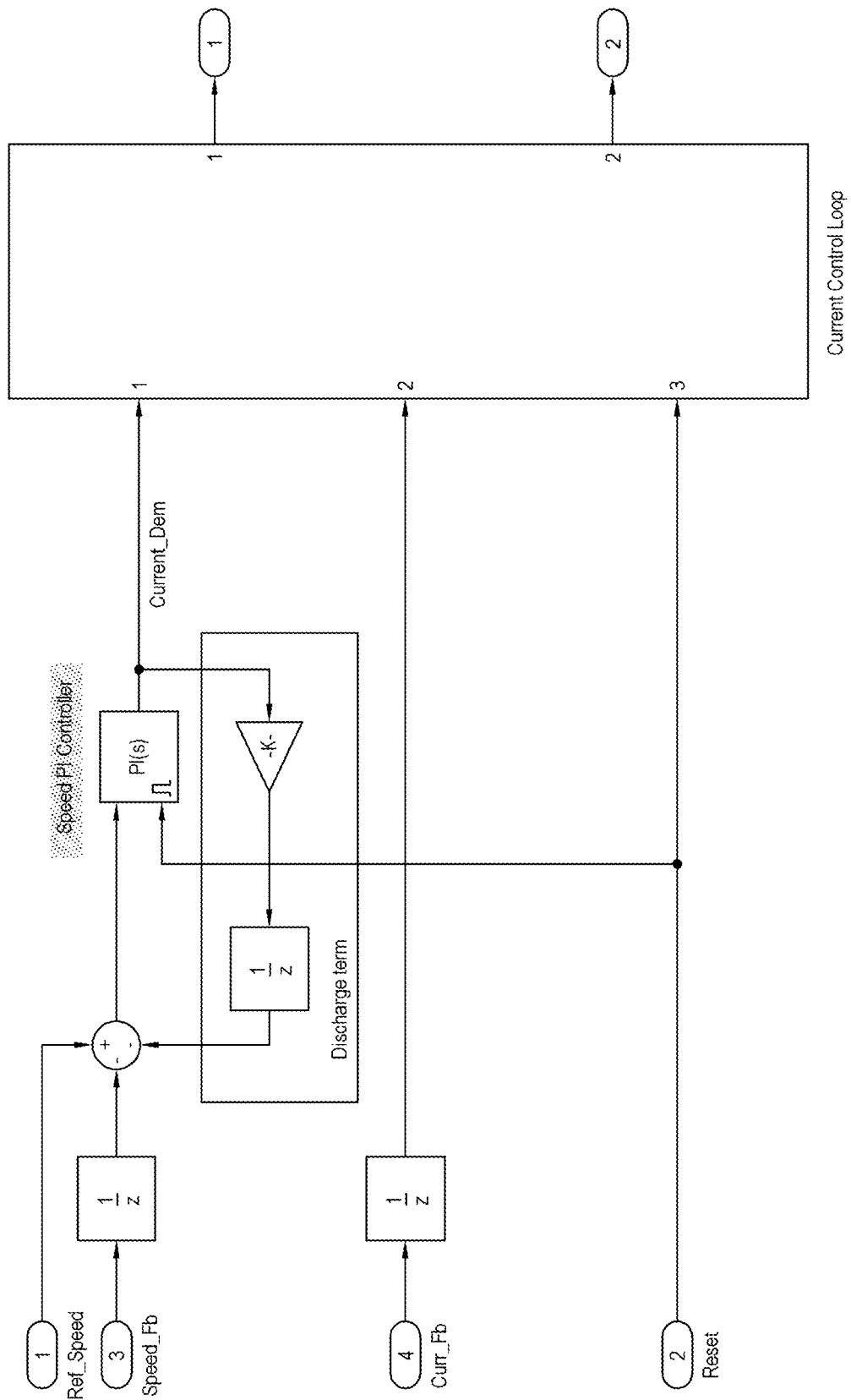
FIG. 4 is a modified control loop that can be implemented within a motor drive to provide improved load sharing.

Essentially, in FIG. 4, the suggested modified control loop additionally makes use of a "discharge term", which is a feedback loop that depends on the magnitude of the current demand of the respective motor drive. The "discharge term" results from the multiplication of the current demand by a small proportionality factor, $k_{DISC}$, which may typically be in the range of 0.01 to 0.02, although this value may be calculated as below, and the result is subtracted from the speed error before it is processed by the speed PI controller of each motor drive. As would be appreciated, FIG. 4 includes unit delay blocks on the feedback signals to avoid circular logic and algebraic loops in the closed loop control system, for the purposes of the Simulink® model.

The discharge gain, $k_{DISC}$, transforms the current demand (measured in Amps) into an additional speed error (measured either in rad/sec or in rpm). Therefore, the discharge gain may be measured in rpm/Amp or in rad/sec/Amp. The optimal value of this gain may be calculated based on the maximum acceptable steady-state speed error. In turn, this depends on the maximum current demand, which is proportional with the maximum torque demand of the motor.

For example, assuming that the maximum motor speed is 10,000 rpm and a speed error of 1% is tolerated, then the maximum motor speed error may be 100 rpm (which is equivalent to 10 rad/sec). Then, assuming further that the maximum motor current amplitude is 100 A, then it may be calculated that the discharge gain may be $$\frac{10 \text{ rad/sec}}{100 A} = 0.1 \text{ rad/sec/Amp}.$$

The value of the integral gain, $k_I$, of the PI controller will dictate how quickly the two motor currents will balance, given the 10 rpm speed error. A larger gain $k_I$, will accelerate the rebalancing. However, the two PI controller gains ($k_p$ and $k_I$) are primarily tuned to also achieve the correct motor drive performance parameters in normal conditions (when no current imbalance is present).

As can be seen in FIG. 4, the PI controller of the motor drive receives, at its input, a speed error between the desired speed (Ref_Speed) and the feedback speed that is measured by the speed sensor (Speed_Fb). Subtracted from this speed error is the discharge term, which may be calculated as outlined above, or a given constant.

In this way, the discharge term produces a small but steady negative value at the input of the speed PI controller (i.e. at the calculated speed error input) of a respective motor drive when the system operates at (or close to) the demanded speed. This steady negative value "discharges" the PI integrator in a slow and gradual manner, the rate of which is proportional to the PI output demand. Therefore, the integrator of the motor drive 121, 122 that is producing a larger current demand will discharge faster than its counterpart in the other drive.

If there exists an imbalance in the current demands produced by each motor drive 121, 122, the motor drive which has a larger current demand would discharge at a faster rate than the drive with the lower demand. Therefore, as the calculated discharge is subtracted directly from the speed error that drives the respective PI controllers of the motor drives, the PI controller of the motor drive with the larger current demand will see a lower absolute speed error, and therefore comparatively reduce its current demand. Similarly, the PI controller of the motor drive with the lower current demand would see a comparatively higher speed error, owing to the smaller discharge term, and therefore increase its current demand compared to the other motor drive. This continues until the current demands of each motor drive 121, 122 converge to a common value. Therefore, rather than providing any direct communication between the motor drives 121, 122, such a control loop provides indirect communication via the speed error itself that drives the PI controllers of the motor drives, resulting in convergence.

The net effect is that the current demands in the two drives will converge towards a common equilibrium point without explicit communication between the two drives (and therefore without another potential point of failure in the system). The scenario that was simulated in FIG. 2 is simulated again in FIG. 5 to demonstrate the effect of the discharge term following an initial imbalance caused by temporary disabling of one of the two paralleled drives.

Figure 5:
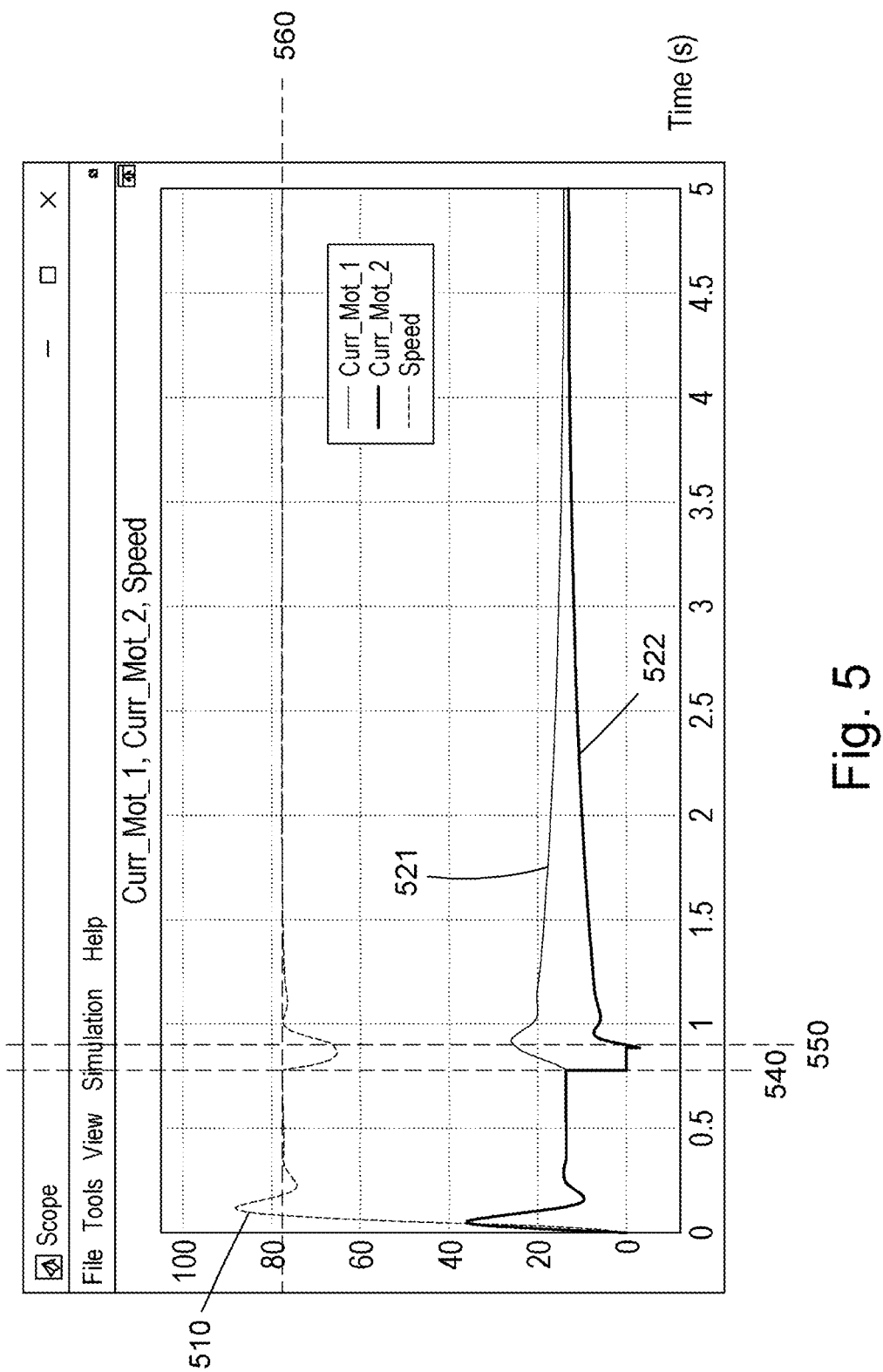
FIG. 5 is a graph showing the results of a simulation of the operation of the system of FIG. 1, wherein the paralleled motor drives utilise the modified control loop of FIG. 4.

FIG. 5 shows the response of an example system 100 (when operating with a modified control such as the control described with respect to FIG. 4) having a desired common speed output 560 immediately after it is turned on at time t=0, and then following a modelled fault in motor drive 122 at time 540, and the subsequent restarting of the motor drive 122 at time 550. Plotted against time on the x-axis is the common speed output 510 of the motors, the current demand 521 of motor drive 121, and the current demand 522 of motor drive 122.

As can be seen, from start up at time t=0 to time 540, the current demand 221, 222 of each motor drive is again balanced, increasing the common speed output to a desired level 560 with relatively balanced current demand. At time 540, where motor drive 122 is temporarily disabled (simulating a failure in motor drive 122), the current demand 522 of motor drive 122 collapses to zero. As a result of the disabling of motor drive 122, the common speed output drops due to the corresponding drop in output torque that is caused by the failure of motor drive 122, and therefore motor 132 failing to produce torque.

The remaining motor drive 121 attempts to correct for the reduction in common output speed 510 by increasing its own current demand 521 to boost the torque production of the remaining motor 131. Again, whilst the motor drive 121 might not be able to recover the full operation to the desired common speed output 260 of the system due to the comparative limited capability of one single drive, when the disabled drive 122 comes back online at time 550, it will initially only have to produce a comparatively small amount of current to help the system meet the desired common speed output 560. Even though the desired speed level 560 after time 550 is relatively quickly reached owing to the already increased current demand 521 of one motor drive 121, as can be seen, the current demand of motor drive 121 is steadily decreased, whilst the current demand 522 of motor drive 122 steadily increases until the two demands reach equilibrium. This is due to the addition of the "discharge term", as described above.

Such a discharge term can, however, introduce a non-zero steady-state speed error, proportional to the gain of the discharge term. In the example of FIG. 5, where the speed demand is 80 rad/sec, due to the discharge error, the actual speed settles at about 77.7 rad/sec. This error is exacerbated in the example of FIG. 5, as the discharge gain was set high (in this example, k=0.17) in order to highlight the convergence effect provided by the discharge term in the simulation results of FIG. 5. In non-speed-critical applications, such a steady-state speed error might be acceptable.

In practice, the discharge gain may be tuned depending on the system requirements. Larger discharge values result in a larger steady-state speed error, but can result in faster load balancing, which may be dependent on the converter thermal margins etc. Therefore, higher discharge gains may be used when the steady-state speed accuracy is less important than accelerating a balanced drive operation. For instance, the large gain 0.17 in FIG. 5 achieves rebalancing within 4 seconds. To the contrary, a small discharge gain value may be used when the steady-state speed accuracy is important.

For example, the discharge gain might be set at the maximum value that is still in accordance with the maximum steady-state speed error that is tolerated by the application, and also depending on the maximum rebalancing time which needs to be achieved.

In order to achieve a shorter recovery time combined with better speed accuracy, gain scheduling techniques may be used. In this way, larger discharge gain values may be applied during speed transients, but then utilising a smaller gain during steady-state. Therefore, the load balancing may be achieved quickly, with a high discharge gain k, and then during steady-state, a lower gain resulting in a lower steady-state error.

Figure 6:
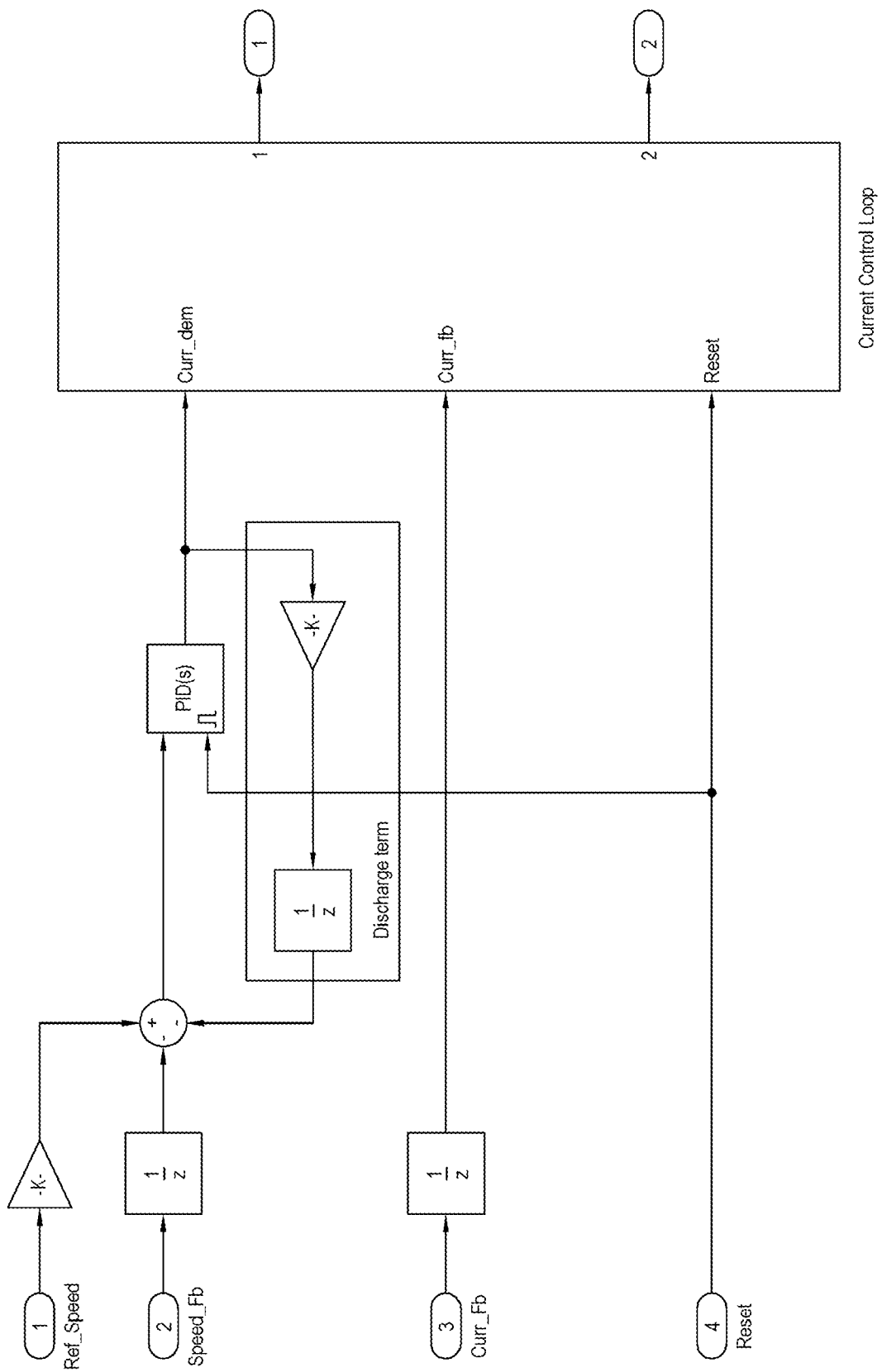
FIG. 6 is a further modified control loop that can be implemented within a motor drive to provide improved load sharing whilst compensating for steady-state error.

Additionally, or alternatively, it is also possible to mitigate the steady-state error by introducing a feedforward gain to increase the speed demand, in order to correct the steady-state error once the discharge term has been subtracted. Such a control loop incorporating such a feedforward loop is shown in FIG. 6.

This provides a simple way of ensuring fast convergence of current demands of the motor drives, whilst mitigating for the steady-state error that otherwise might be provided. Such control is applicable to applications where the relation between speed and load torque is well understood, such as pumps and fans, and therefore the desired feedforward gain can be readily calculated and applied so as to account of the steady-state error introduced by the discharge term. As can be seen, the control loop of FIG. 6 corresponds to that of FIG. 4, but with the reference/desired speed multiplied by a gain $k_{FF}$.

Figure 7:
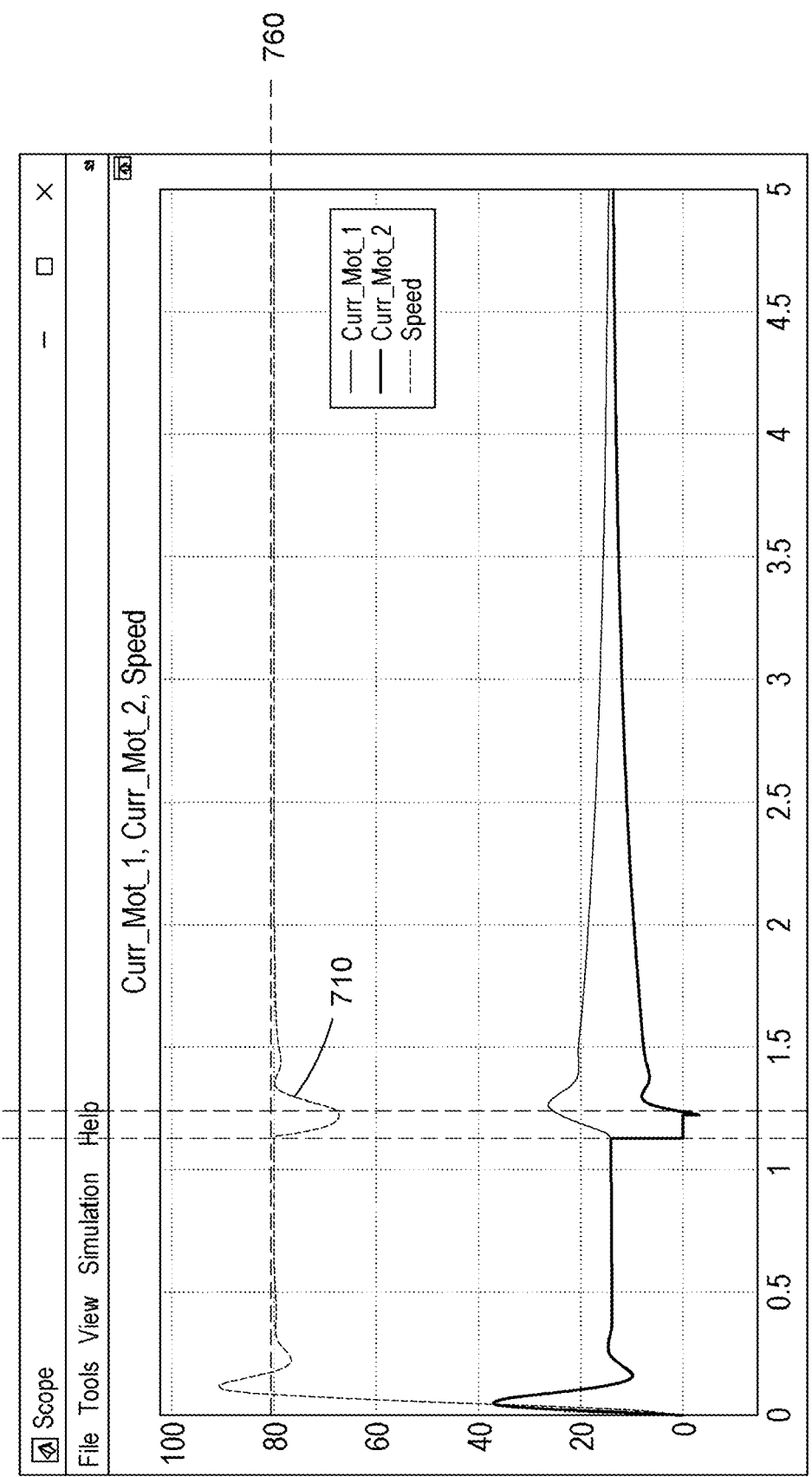
FIG. 7 is a graph showing the results of a simulation of the operation of the system of FIG. 1, wherein the paralleled motor drives utilise the further modified control loop of FIG. 6.

The simulation in FIG. 7 below shows the same simulation as that of FIG. 5, however, in these cases the motor drives utilise a feedforward correction of the speed discussed above in the control of FIG. 6. Like reference numerals in FIG. 7 represent like features shown in FIG. 5. In this example, the relationship between torque and speed are well known and proportional, for example in a case where the load is mostly friction, although such feedforward correction may also be applicable to situations where the relation between speed and torque is non-linear. In such cases, the gain block $k_{FF}$ may be replaced by a suitable non-linear function.

For the example described above, with a speed demand of 80 rad/sec, and a discharge gain of $k_{DISC}$=0.17, resulting in an actual steady-state speed (without feedforward) of about 77.7 rad/sec, an appropriate feed-forward gain may be applied. For example, the feedforward gain, $k_{FF}$, may be calculated by:

$$k_{FF} = \frac{80 \text{ rad/sec}}{77.7 \text{ rad/sec}} = 1.0296$$

Therefore, in order to correct for the steady-state speed error introduced by the discharge term, a feedforward gain of $k_{FF}$=1.0296 was applied to remove the original steady-state error of FIG. 5. It has been found from further simulations that this same gain corrects for the speed errors at all speed demands for this application with the same discharge gain, due to the proportionality between speed and load torque which is specific to this model. However, in uses with a different proportionality between speed and load torque, a different feedforward gain may be used.

As would be appreciated, more complex speed demand correction functions may be applied, for example in cases where the load torque varies non-linearly with speed, for example where the load torque is proportional with the square or the cube of the speed.

As can be seen in FIG. 7, applying the feedforward gain results in a similar load balancing response as the one seen in FIG. 5, but due to the feedforward gain, the steady-state error is eliminated.

Such control systems find particular use in drive systems operating in a speed control mode, for example fans, pumps, and electric propulsion systems. The control algorithm allows for balanced torque production between mechanically paralleled motor drives without the need for direct intercommunication between such drives. This simplifies the hardware configuration and improves reliability by reducing the number of single points of failure in the paralleled system. Additionally, the proposed control can be applied in cases where there are two to N paralleled motors.

The invention claimed is:

1. A system comprising:
   a motor comprising an output shaft and a speed sensor configured to measure a speed of the output shaft; and
   a motor drive comprising a controller configured to output (i) a current demand for the motor based on a speed error between a desired speed of the output shaft and the measured speed of the output shaft and (ii) a feedback signal of the current demand scaled by a first gain, the first gain being subtracted from the speed error before the current demand for the motor is output;
   wherein the controller is further configured to vary the first gain using one or more gain scheduling techniques so as to apply larger gain values during speed transients and smaller gain values during steady-state operation of the motor.

2. The system of claim 1, wherein the motor drive is configured to scale the desired speed of the output shaft by a second gain prior to calculating the speed error.

3. The system of claim 2, wherein the controller is further configured to vary the second gain.

4. The system of claim 3, wherein the controller is configured to vary the second gain based on the measured speed of the output shaft.

5. A system comprising;
   a mechanical load; and
   a first electrical motor and associated motor drive and a second electrical motor and associated motor drive, each electrical motor and associated motor drive comprising the system as claimed in claim 1, wherein the first and second electrical motors are configured to drive the mechanical load in parallel.

6. The system of claim 5, wherein the first and second electrical motors are configured to drive the mechanical load via a gearbox or share a common output shaft.

7. The system of claim 5, further comprising:
   at least a third electrical motor and associated motor drive configured to drive the mechanical load in parallel with the first and second electrical motors.

8. The system of claim 1, further comprising an integral gain configured to accelerate balancing of the motor drive.

9. A method for outputting a current demand to drive an electrical motor of paralleled electric motors driving a mechanical load, the method comprising:
   receiving a desired speed output of the electrical motor;
   measuring an actual speed output of the electrical motor;
   calculating a speed error between the desired speed output of the electrical motor and the actual speed output of the electrical motor and subtracting a first gain;
   outputting a current demand to drive the electrical motor based on (i) the speed error between the desired speed output of the electrical motor and the measured speed of the electrical motor and (ii) a feedback signal of the current demand scaled by the first gain; and varying the first gain by applying one or more gain scheduling techniques so as to apply larger gain values during speed transients and smaller gain values during steady-state operation of the electrical motor.

10. The method of claim 9, further comprising:
scaling the desired speed output of the electrical motor by a second gain prior to calculating the speed error.

11. The method of claim 10, further comprising:
varying the second gain.

12. The method of claim 11, wherein varying the second gain comprises varying the second gain based on the measured speed of the electrical motor.

13. The method of claim 9, further comprising:
accelerating balancing of the electrical motor using an integral gain.

14. A system comprising:
a first electrical motor and associated first motor drive; and
a second electrical motor and associated second motor drive;
wherein the first electrical motor comprises a first output shaft and a first speed sensor configured to measure a speed of the first output shaft;
wherein the first motor drive comprises a first controller configured to output (i) a first current demand for the first electrical motor based on a first speed error between a desired speed of the first output shaft and the measured speed of the first output shaft and (ii) a first feedback signal of the first current demand scaled by a first gain, the first gain being subtracted from the first speed error, and wherein the first controller is further configured to vary the first gain using one or more gain scheduling techniques so as to apply larger gain values during speed transients and smaller gain values during steady-state operation of the first electrical motor;

wherein the second electrical motor comprises a second output shaft and a second speed sensor configured to measure a speed of the second output shaft;

wherein the second motor drive comprises a second controller configured to output (i) a second current demand for the second electrical motor based on a second speed error between a desired speed of the second output shaft and the measured speed of the second output shaft and (ii) a second feedback signal of the second current demand scaled by a second gain, the second gain being subtracted from the second speed error; and wherein the desired speed of the first output shaft is common to the desired speed of the second output shaft.

15. The system of claim 14, wherein the first and second electrical motors are configured to drive a mechanical load via a gearbox.

16. The system of claim 14, further comprising:
a third electrical motor and associated third motor drive configured to drive a mechanical load in parallel with the first and second electrical motors.

17. The system of claim 14, further comprising:
an integral gain configured to accelerate balancing of the first motor drive and the second motor drive.

18. The system of claim 14, wherein the first gain is based on a maximum steady-state speed error.

19. The system of claim 14, wherein the second controller is further configured to vary the second gain.

20. The system of claim 19, wherein the second controller is configured to vary the second gain based on the measured speed of the second output shaft to compensate for steady-state error.

* * * * *